United States Patent
Kanezaki et al.

(10) Patent No.: US 9,261,239 B2
(45) Date of Patent: Feb. 16, 2016

(54) PRESSURE GAS CONTAINER AND VEHICLE INCLUDING THE SAME

(71) Applicant: HONDA MOTOR CO., LTD., Tokyo (JP)

(72) Inventors: Toshihiko Kanezaki, Wako (JP); Yusuke Ishikawa, Wako (JP); Satoshi Kawasaki, Wako (JP); Kazuo Miyagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 14/048,040

(22) Filed: Oct. 8, 2013

(65) Prior Publication Data

US 2014/0103051 A1    Apr. 17, 2014

(30) Foreign Application Priority Data

Oct. 15, 2012 (JP) .................................. 2012-228390

(51) Int. Cl.
*F17C 1/02* (2006.01)
*B65D 85/84* (2006.01)
*F17C 13/00* (2006.01)
*F17C 1/04* (2006.01)

(52) U.S. Cl.
CPC ................. *F17C 13/002* (2013.01); *F17C 1/04* (2013.01); *Y02E 60/321* (2013.01); *Y02E 60/50* (2013.01)

(58) Field of Classification Search
CPC ............ B65D 25/04; F17C 5/02; B21D 51/24
See application file for complete search history.

(56) References Cited

U.S. PATENT DOCUMENTS

| | | | | |
|---|---|---|---|---|
| 2,500,119 | A * | 3/1950 | Cooper | 222/394 |
| 2,827,195 | A * | 3/1958 | Kearns | 220/590 |
| 2,933,214 | A * | 4/1960 | Douyard | 220/588 |
| 2,962,110 | A * | 11/1960 | Depman | 181/211 |
| 3,098,578 | A * | 7/1963 | Rudelick | 220/4.12 |
| 4,045,861 | A * | 9/1977 | Zahid | 29/454 |
| 4,252,244 | A * | 2/1981 | Christian et al. | 220/626 |
| 4,366,917 | A * | 1/1983 | Kotcharian | 220/560.06 |
| 4,398,646 | A * | 8/1983 | Pechacek | 220/586 |
| 4,807,848 | A * | 2/1989 | Macomber | 251/149.4 |
| 5,839,600 | A * | 11/1998 | Moreira et al. | 220/560.04 |
| 6,089,399 | A * | 7/2000 | Felbaum et al. | 220/582 |
| 6,186,356 | B1 * | 2/2001 | Berkley et al. | 220/582 |

(Continued)

FOREIGN PATENT DOCUMENTS

| | | |
|---|---|---|
| JP | 2009-216133 | 9/2009 |
| JP | 2009-257355 | 11/2009 |

(Continued)

*Primary Examiner* — J. Georgory Pickett
*Assistant Examiner* — Jennifer N Zettl
(74) *Attorney, Agent, or Firm* — Mori & Ward, LLP (57) ABSTRACT

A pressure gas container includes a liner to store a gas, a reinforcing layer provided on an outer side of the liner, a boss attached to the liner, and an attachment attached to an outer surface of the liner. The boss has an opening through which the gas is introduced into the liner and through which the gas inside the liner is released. The attachment is to support the liner rotatably when the reinforcing layer is provided. At least one of the boss and the attachment has a gas release channel that allows communication between a gap formed between the outer side and an inner side of the reinforcing layer and a space outside the pressure gas container to release the gas having permeated through the liner and present in the gap between the liner and the reinforcing layer to the space.

4 Claims, 9 Drawing Sheets

(56) References Cited

U.S. PATENT DOCUMENTS

| | | | |
|---|---|---|---|
| 6,517,117 B1* | 2/2003 | Lai | 285/202 |
| 7,195,133 B1* | 3/2007 | Cundiff et al. | 220/589 |
| 7,861,887 B2* | 1/2011 | Ota et al. | 220/581 |
| 8,348,085 B2* | 1/2013 | Wang | 220/584 |
| 8,403,170 B1* | 3/2013 | Lai | 220/581 |
| 8,523,001 B2* | 9/2013 | Acker | 220/584 |
| 2004/0031800 A1* | 2/2004 | Wang | 220/581 |
| 2004/0104235 A1* | 6/2004 | Sakaguchi et al. | 220/581 |
| 2005/0006393 A1* | 1/2005 | Carter | 220/581 |
| 2005/0017016 A1* | 1/2005 | Lombari | 220/721 |
| 2006/0157292 A1* | 7/2006 | Miyagawa et al. | 180/312 |
| 2007/0068957 A1* | 3/2007 | Oliveira et al. | 220/586 |
| 2007/0205201 A1* | 9/2007 | Cundiff et al. | 220/591 |
| 2011/0056472 A1* | 3/2011 | Stone | 124/74 |
| 2011/0101002 A1* | 5/2011 | Strack | 220/586 |
| 2011/0233218 A1* | 9/2011 | Uchimura | 220/581 |
| 2011/0302933 A1* | 12/2011 | Immel | 62/51.1 |
| 2012/0255948 A1* | 10/2012 | Kanezaki et al. | 220/62.11 |

FOREIGN PATENT DOCUMENTS

| | | | |
|---|---|---|---|
| JP | 2011-231900 | 11/2011 | |
| WO | WO2012074815 A2 * | 6/2012 | F17C 1/16 |

* cited by examiner

FIG. 12
BACKGROUND ART ced PRESSURE GAS CONTAINER AND VEHICLE INCLUDING THE SAME

CROSS REFERENCES TO RELATED APPLICATIONS

The present application claims priority under 35 U.S.C. §119 to Japanese Patent Application No. 2012-228390, filed Oct. 15, 2012, entitled "Pressure Gas Container And Vehicle Equipped With The Same." The contents of this application are incorporated herein by reference in their entirety.

BACKGROUND

1. Field

The present disclosure relates to a pressure gas container and a vehicle including the pressure gas container.

2. Description of the Related Art

Figure 11:
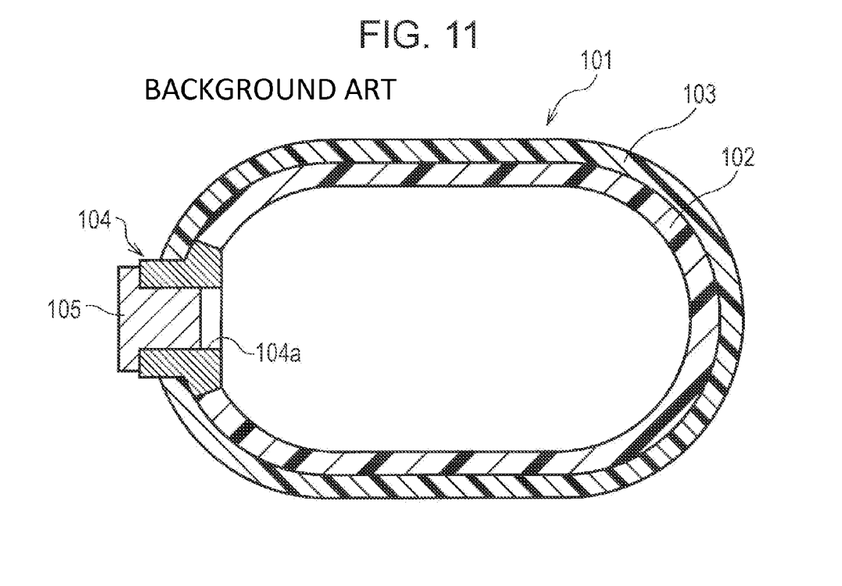
FIG. 11 is a longitudinal sectional view of the structure of a related-art high-pressure gas tank.

FIG. 11 is a longitudinal sectional view of the structure of a related-art high-pressure gas tank.

A high-pressure gas tank 101 for containing a high-pressure gas such as hydrogen includes, for example, a liner 102 and a reinforcing layer 103. The tank-shaped liner 102, which is a part where a high-pressure gas is contained, is formed of resin. The reinforcing layer 103 is formed of, for example, a carbon-fiber-reinforced plastic (CFRP) and covers the liner 102 so as to reinforce the liner 102. Here, the liner 102 provides gas barrier properties for the high-pressure gas tank 101 and the reinforcing layer 103 provides pressure resistance for the high-pressure gas tank 101.

A flange-shaped metal boss 104 having an insertion hole 104a at its center is provided in the high-pressure gas tank 101. A plug 105 is inserted into the insertion hole 104a of the metal boss 104 so as to close the insertion hole 104a.

In the high-pressure gas tank 101, which is used in a fuel-cell vehicle or the like, a high-pressure fuel gas permeates through the resin liner 102. Thus, when the pressure inside the liner 102 of the high-pressure gas tank 101 is reduced, a pressure difference occurs between the pressure inside the resin liner 102 and the pressure of the high-pressure fuel gas accumulated in a gap between the liner 102 and the reinforcing layer 103.

Figure 12:
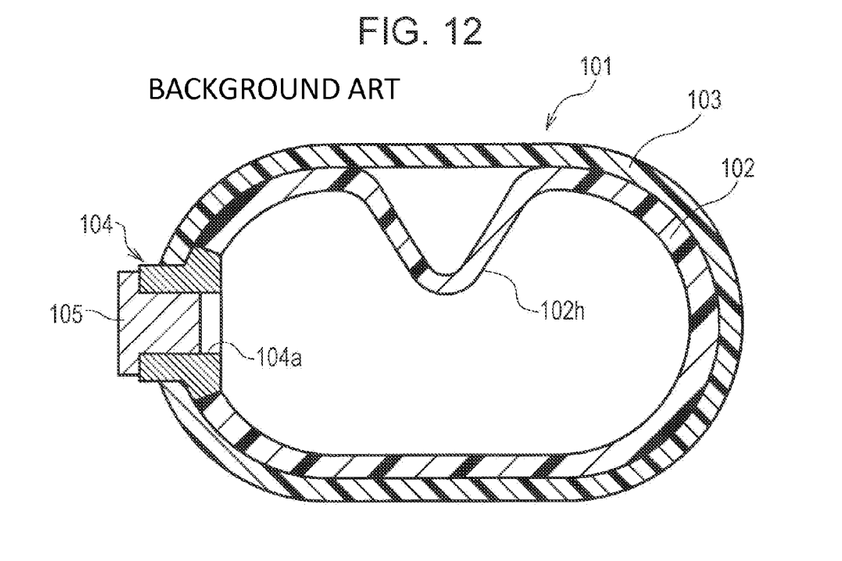
FIG. 12 is a longitudinal sectional view illustrating a state in which buckling occurs in the related-art high-pressure gas tank.

Because of this pressure difference, the high-pressure fuel that accumulates in the gap between the liner 102 and the reinforcing layer 103 presses the liner 102, thereby causing deformation of the liner 102 such as buckling 102h as illustrated in FIG. 12.

In order to prevent the buckling 102h from occurring, a certain residual pressure needs to be maintained inside the liner 102. Thus, in the high-pressure gas tank 101, the effective amount of the fuel gas (the effective amount of hydrogen) that can be used is reduced.

Furthermore, during the maintenance of the high-pressure gas tank 101, the pressure in the high-pressure gas tank 101, that is, the pressure inside the liner 102, needs to be reduced to the atmospheric pressure. In this case, the occurrence of the buckling 102h of the liner 102 may be unavoidable.

In addition, when discarding the high-pressure gas tank 101, it is desirable that there be no accumulation of the gas in the gap between the liner 102 and the reinforcing layer 103.

Thus, technologies for addressing the above-described problem are disclosed in Japanese Unexamined Patent Application Publications No. 2009-216133, No. 2009-257355, and No. 2011-231900 as follows.

Japanese Unexamined Patent Application Publication No. 2009-216133 describes a structure, in which a plurality of vent holes that extend to an outer space are provided in the reinforcing layer 103, thereby dispersing the gas that accumulates in the gap between the liner 102 and the reinforcing layer 103. See, for example, FIG. 2 of Japanese Unexamined Patent Application Publication No. 2009-216133.

Japanese Unexamined Patent Application Publication No. 2009-257355 describes a structure, in which the liner 102 has grooves formed in the outer surface thereof so as to facilitate dispersion of the gas, thereby preventing the gas from accumulating in the gap between the liner 102 and the reinforcing layer 103. See, for example, FIGS. 1A, 1B, 2A, 2B, and 5 of Japanese Unexamined Patent Application Publication No. 2009-257355.

Japanese Unexamined Patent Application Publication No. 2011-231900 describes a structure, in which a gas dispersion facilitating layer, which is an intermediate layer including fine balls formed on the liner 102, is provided between the liner 102 and the reinforcing layer 103 so as to prevent the gas from accumulating. See, for example, FIG. 4 of Japanese Unexamined Patent Application Publication No. 2011-231900.

SUMMARY

According to a first aspect of the present application, a pressure gas container includes a liner to store a gas, a reinforcing layer provided on an outer side of the liner, a boss attached to the liner, the boss having an opening through which the gas is introduced into the liner and through which the gas inside the liner is released, and an attachment attached to an outer surface of the liner. The attachment is used to support the liner such that the liner is rotatable when the reinforcing layer is provided. At least one of the boss and the attachment has an accumulated gas release channel that allows communication between a gap formed between the outer side of the liner and an inner side of the reinforcing layer and a space outside the pressure gas container so as to release the gas having permeated through the liner and present in the gap between the liner and the reinforcing layer to the space outside the pressure gas container.

According to a second aspect of the present application, a vehicle includes the above-described pressure gas container. In the pressure gas container, the accumulated gas release channel is connected to a discharging channel for an exhaust gas.

BRIEF DESCRIPTION OF THE DRAWINGS

FIG. 5 is a longitudinal sectional view illustrating the structure of a high-pressure gas tank of a comparative (related-art)

example, in which a CFRP reinforcing layer is formed around a liner by using an FW process.

DESCRIPTION OF THE EMBODIMENTS

An embodiment of the present disclosure will be described below with reference to the drawings.

Embodiment

Figure 1A:
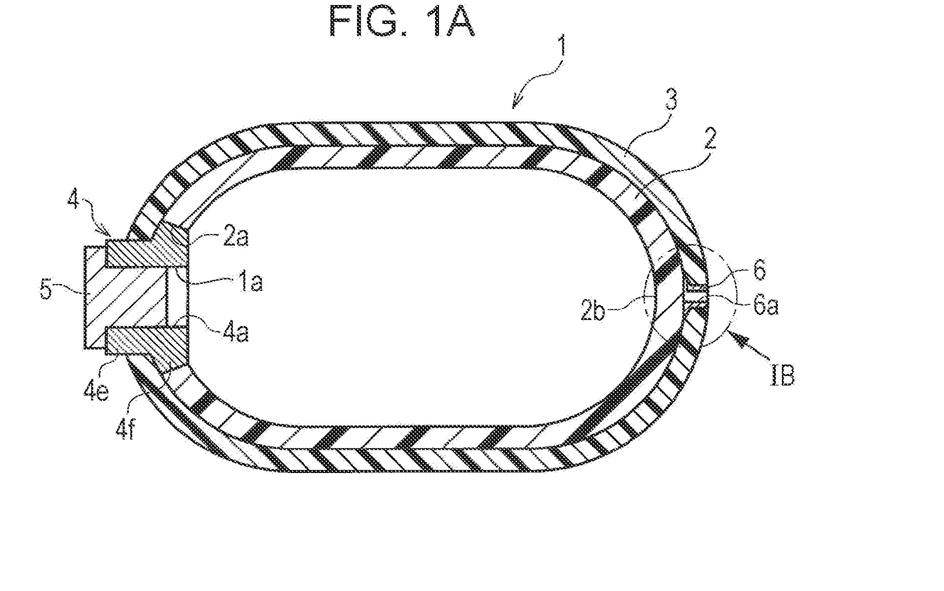
FIG. 1A is a longitudinal sectional view of the structure of a high-pressure gas tank according to an embodiment of the present disclosure.
Figure 1B:
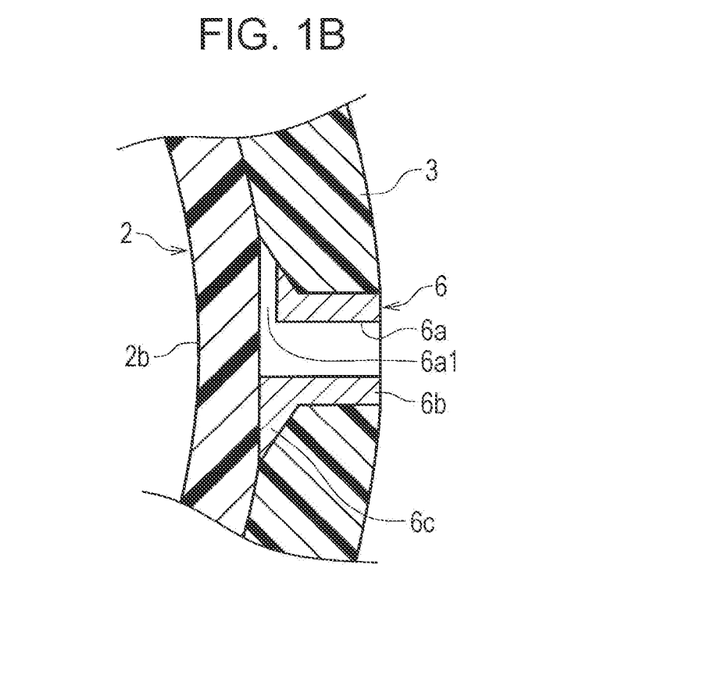
FIG. 1B is an enlarged view of portion IB of FIG. 1A.

FIG. 1A is a longitudinal sectional view of the structure of a high-pressure gas tank 1 according to the embodiment of the present disclosure. FIG. 1B is an enlarged view of portion IB of FIG. 1A.

The high-pressure gas tank (pressure gas container) 1 according to the embodiment contains, for example, high-pressure fuel gas (hydrogen) for a fuel-cell vehicle (vehicle).

The high-pressure gas tank 1 includes a liner 2 and a reinforcing layer 3. The liner 2 having a tank shape is formed of resin and contains a high-pressure gas such as compressed hydrogen. The reinforcing layer 3 is formed of, for example, a carbon-fiber-reinforced plastic (CFRP) so as to cover and reinforce the liner 2.

The high-pressure gas tank 1 and the liner 2 each have a tank shape defined by a cylindrical structure, both the ends of which in the axial direction are closed. The reinforcing layer 3 is formed to have a shape conforming to the outer shape of the liner 2.

The high-pressure gas tank 1 has a gas inlet/outlet port 1a at one end portion thereof in the axial direction. The inlet/outlet port 1a is an insertion hole that allows the inner and outer spaces of the liner 2 to communicate with each other and allows high-pressure gas to be introduced into and discharged from the inside of the liner 2. Specifically, a metal boss 4, which has the inlet/outlet port 1a at its center, is provided in an opening 2a at the one end portions of the liner 2 of the high-pressure gas tank 1.

The metal boss 4 has the inlet/outlet port 1a, a cylindrical portion 4e, and a flange portion 4f. The inlet/outlet port 1a as an insertion hole penetrates through the metal boss 4 at a central portion of the metal boss 4. The metal boss 4 is formed of, for example, a stainless steel (such as SUS304) by casting or machining.

A tank plug 5 is inserted into the inlet/outlet port 1a of the metal boss 4 so as to close the inlet/outlet port 1a. The tank plug 5 is opened by opening a valve (not shown) incorporated in the tank plug 5, which is inserted into the inlet/outlet port 1a of the metal boss 4.

The reinforcing layer 3, the CFRP of which is formed by the filament winding (FW) process, is provided with a spindle attachment for FW 6 used for the FW process at the other end portion of the high-pressure gas tank 1 in the axial direction such that the spindle attachment for FW 6 is in contact with the other end portion (bottom portion 2b) of the liner 2. That is, the high-pressure gas tank 1 includes a barrel portion and a pair of header portions, one of which is provided with the metal boss 4 and the other of which is provided with the spindle attachment for FW 6.

As illustrated in FIG. 1B, the spindle attachment for FW 6 has a gas dispersion port 6a as an insertion hole at a central portion thereof. The gas dispersion port 6a has a cylindrical portion 6b and a conical portion 6c.

Figure 2A:
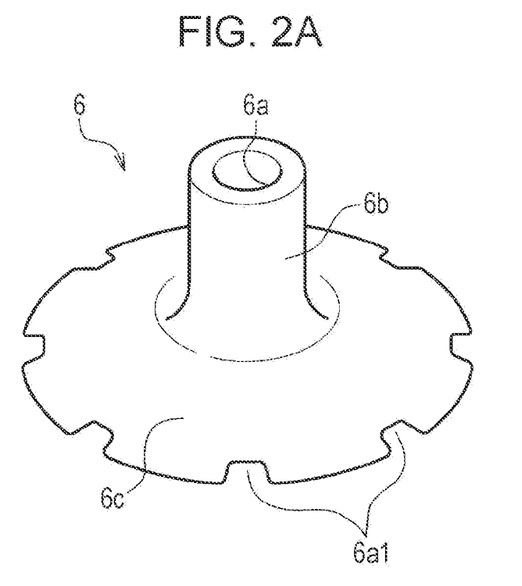
FIG. 2A is a perspective view of a spindle attachment for filament winding (FW) seen from a cylindrical portion side.
Figure 2B:
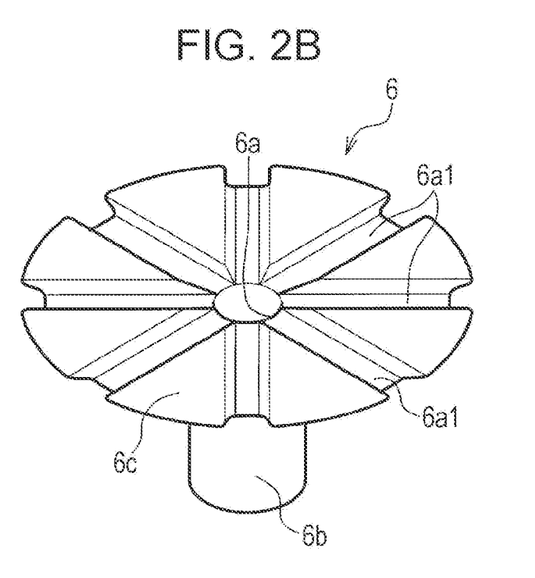
FIG. 2B is a perspective view of the spindle attachment for FW seen from a conical portion side.

FIG. 2A is a perspective view of the spindle attachment for FW 6 seen from the cylindrical portion 6b side. FIG. 2B is a perspective view of the spindle attachment for FW 6 seen from the conical portion 6c side.

Gas vent passages (holes) 6a1, through which gas accumulated in a gap between the liner 2 and the reinforcing layer 3 is released, are formed as recesses radially arranged around the gas dispersion port 6a in portions of the conical portion 6c of the spindle attachment for FW 6 opposing an outer surface of the liner 2. The gas vent passages 6a1 as radially arranged recesses communicate with the gas dispersion port 6a at the central portion of the spindle attachment for FW 6.

This allows gas accumulated in the gap between the liner 2 and the reinforcing layer 3 to pass through the gap between the liner 2 and the reinforcing layer 3, to be released and collected into the gas vent passages (holes) 6a1 as radially arranged recesses, and to be dispersed to the outside through the gas dispersion port 6a.

By forming the gas vent passages (holes) 6a1 and the gas dispersion port 6a as described above in the spindle attachment for FW 6, high-pressure gas having permeated through the liner 2 and accumulated in the gap between the liner 2 and the reinforcing layer 3 can be discharged through the gas dispersion port 6a without generating pressure or increasing the pressure of the high-pressure gas in the gap between the liner 2 and the reinforcing layer 3. Here, in the case where the amount of the gas to be dispersed through the gas dispersion port 6a is small, the high-pressure gas having permeated through the liner 2 is dispersed (released) into the atmosphere outside the high-pressure gas tank 1 through the gas dispersion port 6a.

In the case where the amount of the high-pressure gas having permeated through the liner 2 and to be dispersed through the gas dispersion port 6a is large, the gas dispersion port 6a is connected to a vent line (discharging channel, not shown) of the vehicle, thereby allowing the gas having permeated through the liner 2 to flow into the vent line. That is, in the case where the amount of the gas to be dispersed through the gas dispersion port 6a is large, by connecting the gas dispersion port 6a to the vent line (not shown), the gas can be appropriately released to the outside of the vehicle.

Next, a spindle attachment for FW A6 of an alternative example is described.

Figure 3A:
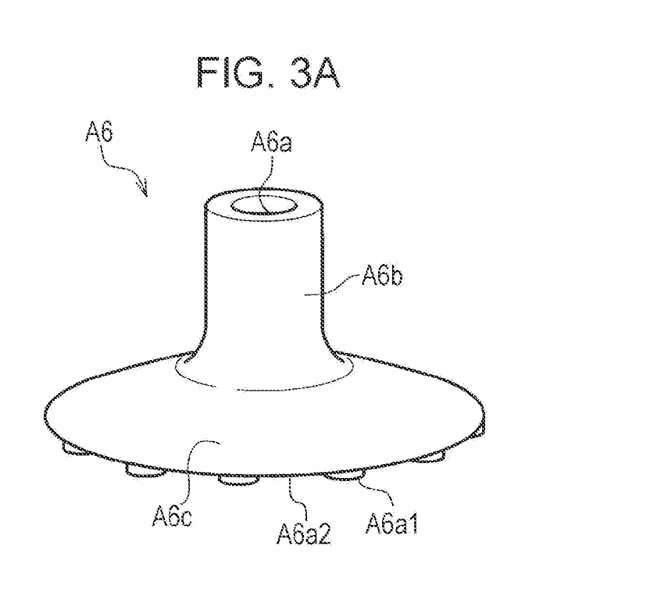
FIG. 3A is a perspective view of a spindle attachment for FW of an alternative example seen from a cylindrical portion side.
Figure 3B:
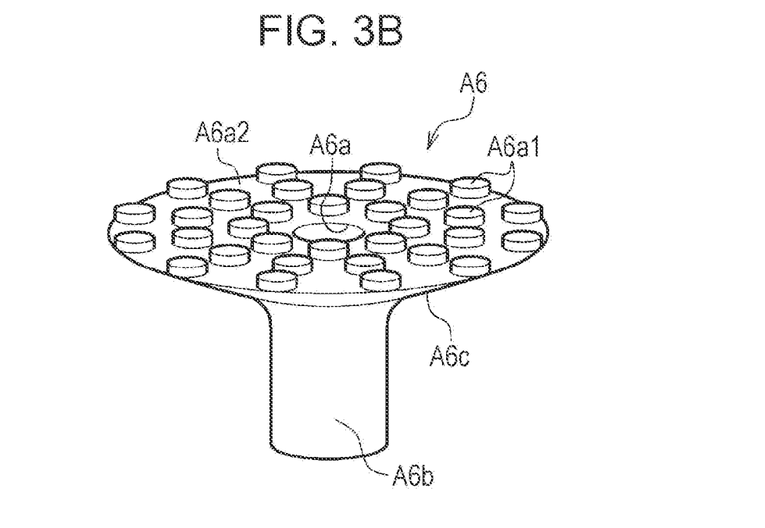
FIG. 3B is a perspective view of the spindle attachment for FW of the alternative example seen from a conical portion side.

FIG. 3A is a perspective view of the spindle attachment for FW A6 of the alternative example seen from a cylindrical portion A6b side. FIG. 3B is a perspective view of the spindle attachment for FW A6 of the alternative example seen from the conical portion A6c side.

The spindle attachment for FW A6 of the alternative example has a gas dispersion port A6a as an insertion hole at a central portion thereof. The gas dispersion port A6a has a cylindrical portion A6b and a conical portion A6c.

Gas vent projections A6a1, which is provided to release the gas accumulated in the gap between the liner 2 and the reinforcing layer 3, project in portions of the conical portion A6c of the spindle attachment for FW A6 of the alternative example opposing the outer surface of the liner 2. A gas vent recess A6a2 is defined by a portion of the conical portion A6c opposing the outer surface of the liner 2 except for portions where the projection-shaped gas vent projections A6a1 are formed. A central portion of the gas vent recess A6a2 communicates with the gas dispersion port A6a.

This allows the gas accumulated in the gap between the liner 2 and the reinforcing layer 3 to pass through the gap between the liner 2 and the reinforcing layer 3, to be released and collected into the gas vent recess A6a2 of the spindle attachment for FW A6 of the alternative example, and to be dispersed to the outside through the gas dispersion port A6a.

Method of Producing High-Pressure Gas Tank 1

Next, a method of producing the high-pressure gas tank 1 is described.

A pair of members having, for example, the shapes of left and right portions (FIG. 1A) of the liner 2 in the axial direction are initially formed of a resin such as a polyamide resin by injection molding.

Then, these members having the shapes of the left and right portions of the liner 2 are welded together so as to form the liner 2. Although the liner 2 of this example is formed of a thermoplastic resin, the liner 2 may be formed of another resin as long as it is formed of a resin. The liner 2 may be formed by another production method than the above-described method.

Next, the metal boss 4 is attached to the opening 2a of the liner 2. The metal boss 4 may be molded into the liner 2 by insert molding. The metal boss 4 may be attached to the liner 2 by a different method.

Next, the reinforcing layer 3 is formed of CFRP over the outer surface of the liner 2. The CFRP reinforcing layer 3 is formed around the liner 2 by the filament winding process.

The CFRP reinforcing layer 3 is formed on the outer surface of the liner 2 as follows.

Figure 4A:
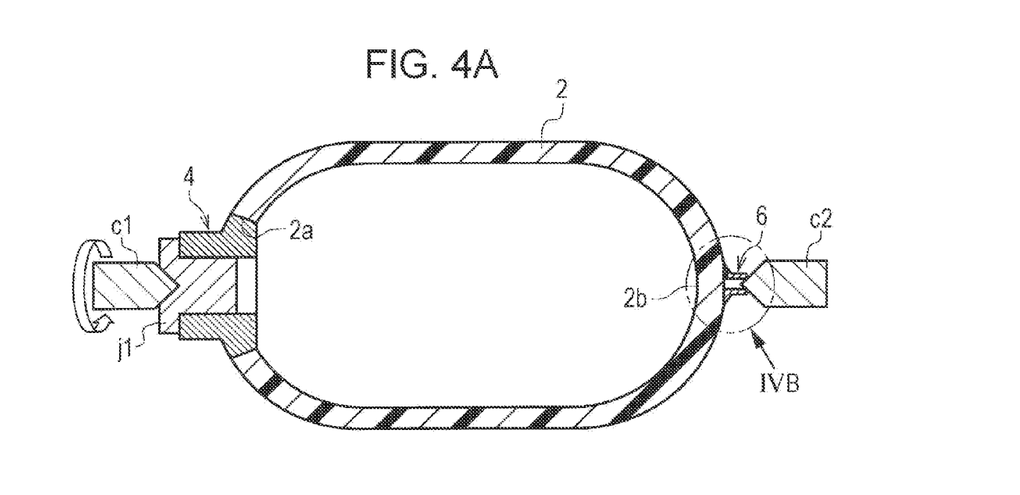
FIG. 4A is a longitudinal sectional view illustrating the state of a liner and a region around the liner when a CFRP reinforcing layer is formed on the outer surface of the liner.
Figure 4B:
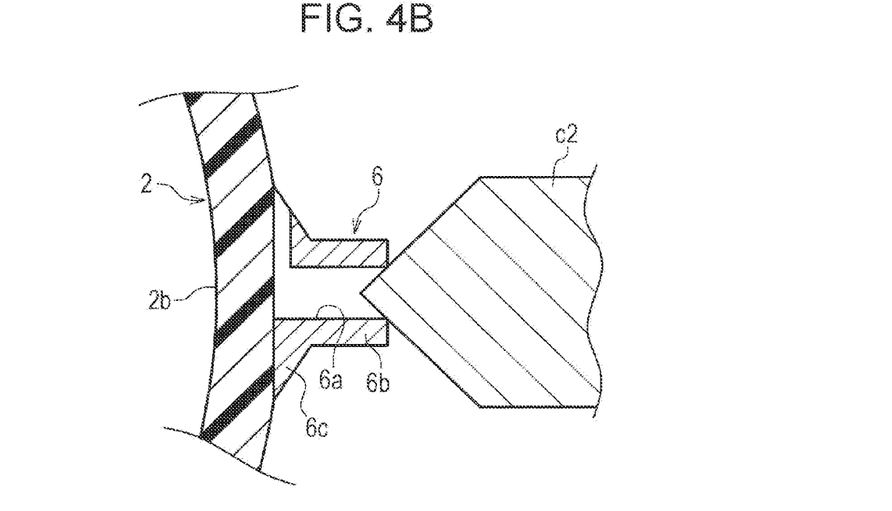
FIG. 4B is an enlarged view of portion IVB of FIG. 4A.

FIG. 4A is a longitudinal sectional view illustrating the state of the liner 2 and a region around the liner 2 when the CFRP reinforcing layer 3 is formed on the outer surface of the liner 2. FIG. 4B is an enlarged view of portion IVB of FIG. 4A.

Referring to FIG. 4A, a first FW apparatus center c1 is initially brought into contact with the center of an FW jig j1, which has been inserted into the inlet/outlet port 1a of the metal boss 4 attached to the opening 2a at the one end portion of the liner 2 in the axial direction. At the same time, as illustrated in FIG. 4B, a second FW apparatus center c2 is engaged with the gas dispersion port 6a of the cylindrical portion 6b of the spindle attachment for FW 6, which is attached to the bottom portion 2b at the other end portion of the liner 2 in the axial direction.

Thus, as illustrated in FIG. 4A, by holding the one and the other end portions of the liner 2 in the axial direction with the first and second FW apparatus centers c1 and c2, respectively, and by rotating the first FW apparatus center c1, the liner 2 is rotated.

A carbon fiber is dipped into a melted resin such as an epoxy resin contained in a case (not shown). The carbon fiber impregnated with the resin is wound on the outer surface of the liner 2 being rotated.

After that, the resin adhering to the carbon fiber wounded on the outer surface of the liner 2 is cured in a furnace. Thus, the high-pressure gas tank 1 illustrated in FIG. 1A is completed.

Figure 5:
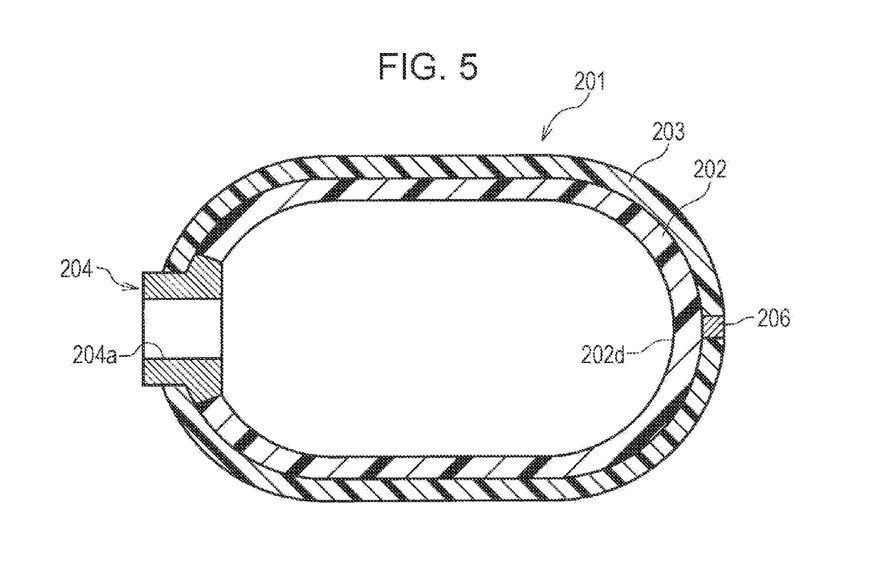

FIG. 5 is a longitudinal sectional view illustrating the structure of a high-pressure gas tank 201 of a comparative example, in which a CFRP reinforcing layer 203 is formed around a liner 202 by using an FW process similar to that of the present embodiment.

In comparison with the high-pressure gas tank 1 of the present embodiment (present disclosure), a spindle attachment for FW 206 of the high-pressure gas tank 201 has a structure different from that of the present embodiment.

Since other structures of the high-pressure gas tank 201 are similar to those of the high-pressure gas tank 1 illustrated in FIGS. 1A and 1B, similar elements are denoted by reference signs in the 200 series, thereby omitting the detailed description.

In the high-pressure gas tank 201 of the comparative example, unlike the spindle attachment for FW 6 of the embodiment, the spindle attachment for FW 206 provided in the CFRP reinforcing layer 203 has no gas dispersion port 6a (see FIG. 1A). More specifically, the spindle attachment for FW 206 is usually attached to the liner 202 in order to help rotate the liner 202 and prevent the carbon fiber to be wound on a top portion of a liner dome portion 202d from sliding while the FW process is being performed. However, after the tank has been produced, the spindle attachment for FW 206 has no function in actual use of the high-pressure gas tank 201.

A metal boss 204 is joined to the liner 202 and the reinforcing layer 203 in a highly gas tight manner. Likewise, the spindle attachment for FW 206 is joined to the liner 202 and the reinforcing layer 203 also in a highly gas tight manner.

In the high-pressure gas tank 201 of the comparative example, gas inside the liner 202 may permeate through the liner 202 and leak into the gap between the reinforcing layer 203 and the liner 202. In the above-described structure, since the gap between the reinforcing layer 203 and the liner 202 are formed in a highly gas tight manner, the gas is unlikely to be released through the gaps in portions where the reinforcing layer 203 is joined to the metal boss 204 and the reinforcing layer 203 is joined to the spindle attachment for FW 206.

Figure 6:
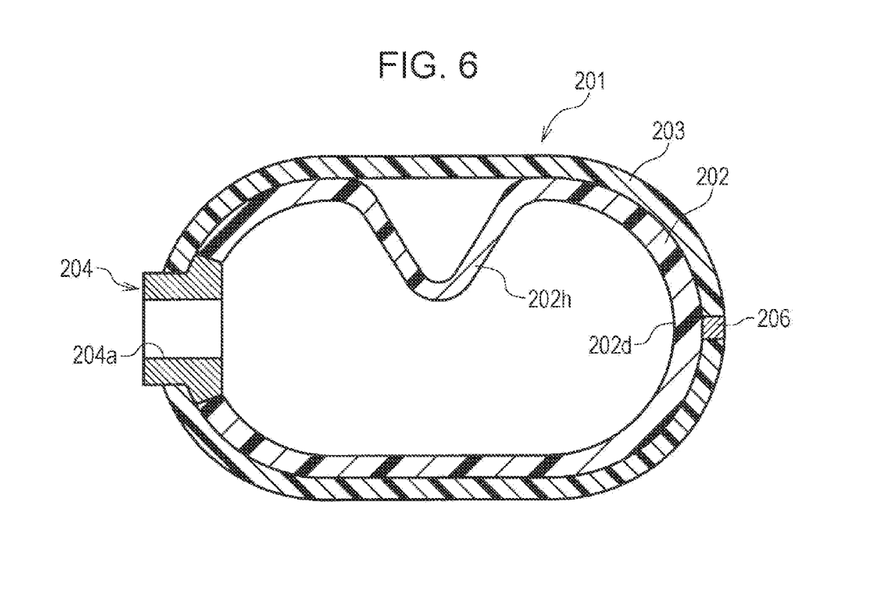
FIG. 6 is a longitudinal sectional view illustrating a state in which buckling occurs in the high-pressure gas tank of the comparative (related-art) example illustrated in FIG. 5.

Thus, when the pressure inside the liner 202 is reduced for, for example, maintenance, the high-pressure gas in the gap between the liner 202 and the reinforcing layer 203 presses the liner 202, thereby causing buckling 202h illustrated in FIG. 6.

In contrast, in the high-pressure gas tank 1 of the embodiment, as illustrated in FIG. 1B, the spindle attachment for FW 6 has the gas dispersion port 6a as the insertion hole. Thus, in usual use of the tank, the gas having permeated through the liner 2 can be dispersed (released) to the outside through the spindle attachment for FW 6, which originally has no function, provided in the bottom portion 2b.

More specifically, with the gas dispersion port 6a, the gas having permeated through the liner 2 is dispersed to the outside through the gas dispersion port 6a before the gas accumulates in the gap between the liner 2 and the reinforcing layer 3 and generates or increases the pressure in the gap between the liner 2 and the reinforcing layer 3. Thus, there is no occurrence of buckling. As a result, a tank residual pressure, the pressure being required to suppress buckling, in other words, the amount of hydrogen required to remain (residual hydrogen amount) inside the liner 2 can be reduced. Thus, the effective amount of hydrogen that can be extracted from the high-pressure gas tank 1 for use is increased.

First Variant

Figure 7:
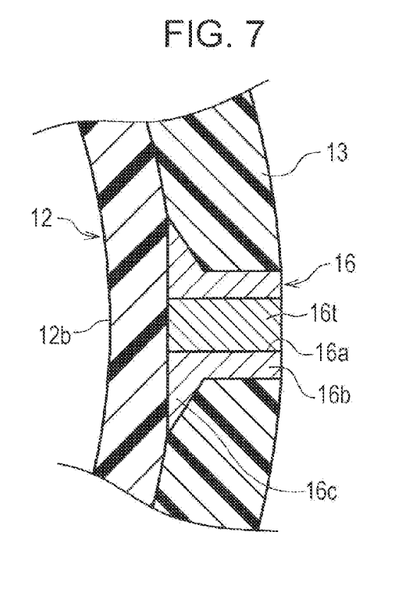
FIG. 7 is a portion of a first variant corresponding to the enlarged view of the portion IB of FIG. 1A.

FIG. 7 is a portion of a first variant corresponding to the enlarged view of the portion IB of FIG. 1A.

Similarly to the embodiment, a spindle attachment for FW 16 of a high-pressure gas tank of the first variant has a gas dispersion port 16*a* as an insertion hole penetrating therethrough at a central portion thereof. The gas dispersion port 16*a* has a cylindrical portion 16*b* and a conical portion 16*c*. In the gas dispersion port 16*a*, a gas permeation member 16*t* formed of a material having a high gas permeability is provided.

Since other structures are similar to those of the embodiment, similar elements are denoted by reference signs in the ten series, thereby omitting the detailed description.

In the high-pressure gas tank of the first variant, the gas permeation member 16*t* formed of a material having a high permeability for high-pressure gas (hydrogen) is provided in the gas dispersion port 16*a* of the spindle attachment for FW 16.

The gas permeation member 16*t* is formed of, for example, silicone rubber, a foamed material having an open cell structure (polyurethane foam, polystyrene foam, polyethylene foam, or the like), or a porous sintered metal such as that used for a filter or the like.

In order to form the gas permeation member 16*t* in the gas dispersion port 16*a* of the spindle attachment for FW 16, the following methods can be used in accordance with the material.

For example, in the case where a material such as a foamed material is used, the material in the uncured state is injected into the gas dispersion port 16*a* and cured by cooling or heating.

Alternatively, in the case where a material such as silicone rubber is used, a material having the same size as the gas dispersion port 16*a* or the size slightly larger than the gas dispersion port 16*a* is prepared. The thus prepared material is inserted (press-fitted) into the gas dispersion port 16*a* or bonded (secured) to the gas dispersion port 16*a* by an adhesive.

Alternatively, in the case where a material such as a sintered metal is used, a female thread is formed in the gas dispersion port 16*a*, a male thread is formed on the gas permeation member 16*t* formed of a sintered metal or the like to be inserted into the gas dispersion port 16*a*, and the gas permeation member 16*t* formed of a sintered metal or the like is screwed into the gas dispersion port 16*a*.

With the gas permeation member 16*t*, the gas having permeated through a liner 12 is dispersed (released) to the outside of the tank. In addition, the gas permeation member 16*t* prevents foreign matter such as water from entering the high-pressure gas tank from the outside of the high-pressure gas tank through the gas dispersion port 16*a*.

Also with this structure, in the case where the amount of the gas to be dispersed through the gas permeation member 16*t* is small, the gas is dispersed (released) into the atmosphere. In contrast, in the case where the amount of the gas to be dispersed through the gas permeation member 16*t* is large, the gas dispersion port 16*a* having the gas permeation member 16*t* therein is connected to the vent line (discharging channel) of the vehicle, thereby allowing the gas having permeated through the liner 12 to flow into the vent line. That is, in the case where the amount of the gas to be dispersed through the gas dispersion port 16*a* is large, by connecting the gas dispersion port 16*a* to the vent line, the gas can be appropriately released to the outside of the vehicle.

The gas permeation member 16*t* other than the above-described examples can be used as long as the gas stored in the high-pressure gas tank permeates through the gas permeation member 16*t*. Also, a method of forming the gas permeation member 16*t* in the gas dispersion port 16*a* of the spindle attachment for FW 16 other than the above-described examples of the method may be used.

Second Variant

Figure 8A:
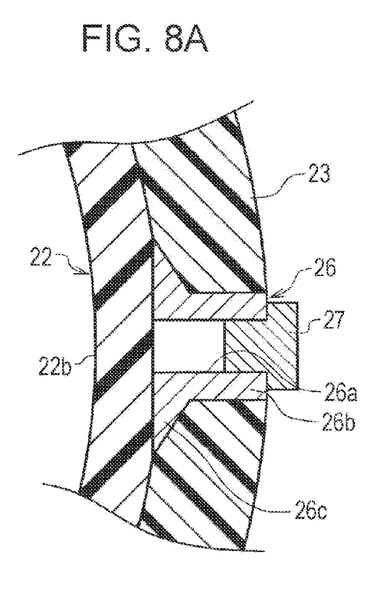
FIGS. 8A and 8B are portions of a second variant corresponding to the enlarged view of the portion IB of FIG. 1A, respectively illustrating a state in which a tank closing plug is closed and a state in which the tank closing plug is opened.
Figure 8B:
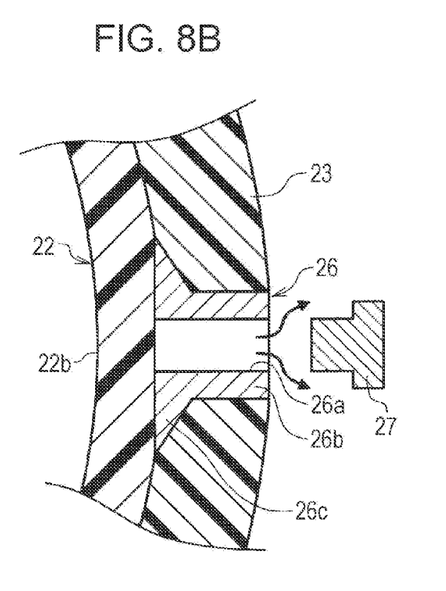

FIGS. 8A and 8B are portions of a second variant corresponding to the enlarged view of the portion IB of FIG. 1A. FIGS. 8A and 8B respectively illustrate a state in which a tank closing plug 27 is closed and a state in which the tank closing plug 27 is opened.

Similarly to the embodiment, a spindle attachment for FW 26 of a high-pressure gas tank of the second variant has a gas dispersion port 26*a* as an insertion hole penetrating therethrough at a central portion thereof. The gas dispersion port 26*a* has a cylindrical portion 26*b* and a conical portion 26*c*. In addition, the tank closing plug 27, which can be opened and closed, is provided in the gas dispersion port 26*a*. Since other structures are similar to those of the embodiment, similar elements are denoted by reference signs in the twenty series, thereby omitting the detailed description.

It can be thought that, in usual use of the high-pressure gas tank, the pressure of the gas inside the liner 22 and the pressure of the gas having penetrated through the liner 22 and present in the gap between the liner 22 and a reinforcing layer 23 are substantially equal to each other. Thus, there is no possibility of the occurrence of buckling.

In contrast, when the inner pressure of the tank (pressure inside the liner 22) is reduced to the atmospheric pressure for maintenance or discarding of the tank, the pressure of the gas inside the liner 22 and the pressure of the gas having penetrated through the liner 22 and present in the gap between the liner 22 and the reinforcing layer 23 are significantly different from each other. That is, the pressure of the gas inside the liner 22 becomes the atmospheric pressure while the pressure of the gas having penetrated through the liner 22 and present in the gap between the liner 22 and the reinforcing layer 23 is a high pressure. Thus, due to this differential pressure, an external pressure is applied to the liner 22, and accordingly, buckling occurs.

Thus, by opening the tank closing plug 27 for maintenance of the tank or discarding the tank so as to disperse the gas in the gap between the liner 22 and the reinforcing layer 23 and reduce the pressure of the gas in the gap between the liner 22 and the reinforcing layer 23, the differential pressure can be reduced, and accordingly, the occurrence of buckling can be suppressed.

Also with this structure, in the case where the amount of the gas to be dispersed through the gas dispersion port 26*a* is small, the gas is dispersed (released) into the atmosphere by opening the tank closing plug 27, and in the case where the amount of the gas to be dispersed through the gas dispersion port 26*a* is large, the gas dispersion port 26*a* is connected to the vent line (discharging channel) of the vehicle, thereby allowing the gas having penetrated through the liner 22 to flow into the vent line. Thus, the gas can be appropriately released to the outside of the vehicle.

Third Variant

Figure 9A:
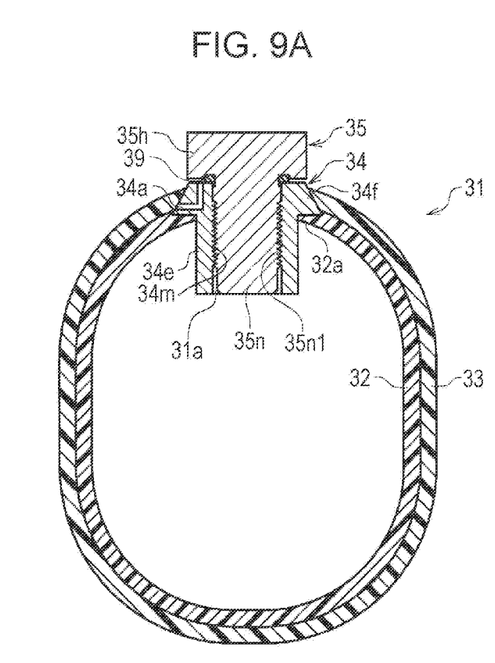
FIG. 9A is a longitudinal sectional view of the internal structure of a high-pressure gas tank of a third variant.
Figure 9B:
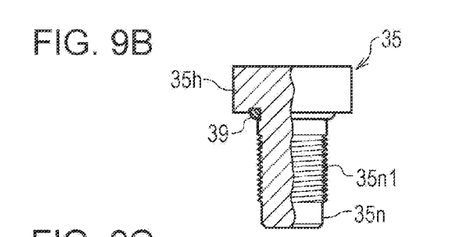
FIG. 9B illustrates a tank plug of the high-pressure gas tank of the third variant.
Figure 9C:
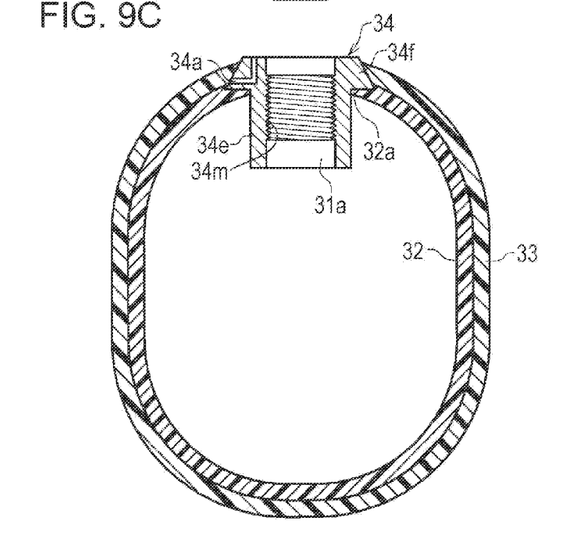
FIG. 9C is a longitudinal sectional view illustrating a state in which the plug of the high-pressure gas tank of the third variant is opened.

FIG. 9A is a longitudinal sectional view of the internal structure of a high-pressure gas tank 31 of a third variant. FIG. 9B illustrates a tank plug 35 of the high-pressure gas tank of the third variant. FIG. 9C is a longitudinal sectional view illustrating a state in which the tank plug 35 of the high-pressure gas tank 31 of the third variant is opened.

Unlike the embodiment, in the high-pressure gas tank 31 of the third variant, a vent hole 34a is formed in a metal boss 34, to which the tank plug 35 is attached, and surface sealing is provided over the gap between the tank plug 35 and the metal boss 34. Since other structures are similar to those of the embodiment, elements similar to those of the embodiment are denoted by reference signs in the thirty series, thereby omitting the detailed description.

The metal boss 34, which has an inlet/outlet port 31a at its center, is provided in an opening 32a at one end portions of a liner 32 of the high-pressure gas tank 31 of the third embodiment.

The metal boss 34 has the inlet/outlet port 31a, a cylindrical portion 34e, and a flange portion 34f. The inlet/outlet port 31a as an insertion hole penetrates through the metal boss 34 at a central portion of the metal boss 34. The metal boss 34 is formed of, for example, a stainless steel (such as SUS304) by casting or machining. A female thread 34m is formed in the inlet/outlet port 31a of the metal boss 34 so as to be engaged with the tank plug 35.

The vent hole 34a is formed in the flange portion 34f of the metal boss 34. The vent hole 34a is a through hole through which the gas, which has penetrated through the liner 32 from a space inside the liner 32 and leaked into the gap between the liner 32 and a reinforcing layer 33, is released to the outside of the high-pressure gas tank 31.

As illustrated in FIG. 9B, the tank plug 35 has a screw portion 35n and a plug head portion 35h. A male thread 35n1, which is engaged with the female thread 34m of the metal boss 34, is formed in the screw portion 35n.

In the tank plug 35, a sealing member 39 such as an O-ring or a rubber packing is provided at a boundary between the plug head portion 35h and the screw portion 35n. The sealing member 39 is in contact with the flange portion 34f of the metal boss 34 so as to provide surface sealing over the gap between the plug head portion 35h of the tank plug 35 and the flange portion 34f of the metal boss 34 in a gas tight manner. The gas inside the liner 32 can be prevented from leaking to the outside through the gap between the plug head portion 35h of the tank plug 35 and the flange portion 34f of the metal boss 34 by the sealing member 39.

In order to use the high-pressure gas tank 31, the male thread 35n1 of the screw portion 35n of the tank plug 35 (see FIG. 9B) is engaged with the female thread 34m of the metal boss 34. The tank plug 35 is screwed into the metal boss 34. Then, a high pressure gas such as a fuel gas is charged into a space formed by the liner 32 of the high-pressure gas tank 31 illustrated in FIG. 9C. After that, by closing a valve (not shown) incorporated in the tank plug 35, the tank plug 35 of the inlet/outlet port 31a is closed. In order to open the tank plug 35 of the inlet/outlet port 31a, the valve (not shown) incorporated in the tank plug 35 is opened.

According to the third variant, the gas having permeated through the liner 32 to the outside of the liner 32 is dispersed (released) through the vent hole 34a of the metal boss 34 before the gas accumulates in the gap between the liner 32 and the reinforcing layer 33 and generates or increases the pressure in the gap between the liner 32 and the reinforcing layer 33. Thus, the differential pressure between the gas inside the liner 32 and the gas present in the gap between the liner 32 and the reinforcing layer 33 is reduced, and accordingly, there is no occurrence of buckling. As a result, a tank residual pressure inside the liner 32, that is, the amount of gas required to remain inside the liner 32 can be reduced. Thus, the amount of gas (amount of hydrogen) that can be used can be increased.

Fourth Variant

Figure 10A:
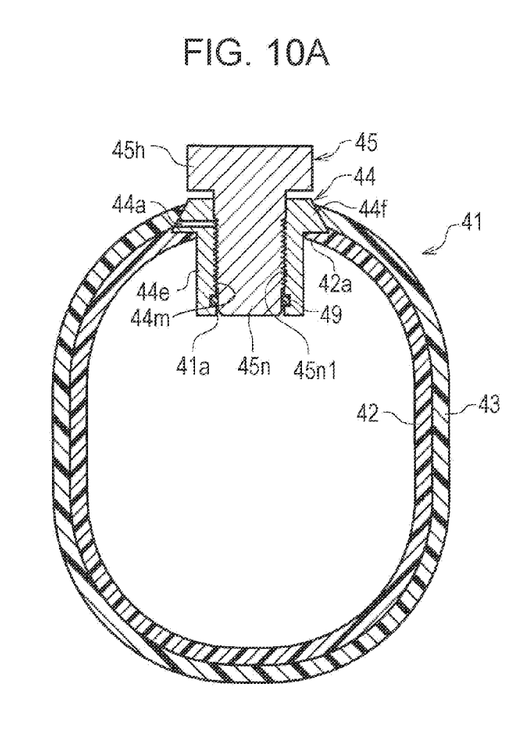
FIG. 10A is a longitudinal sectional view of a main portion of the internal structure of a high-pressure gas tank of a fourth variant.
Figures 10B, 10C:
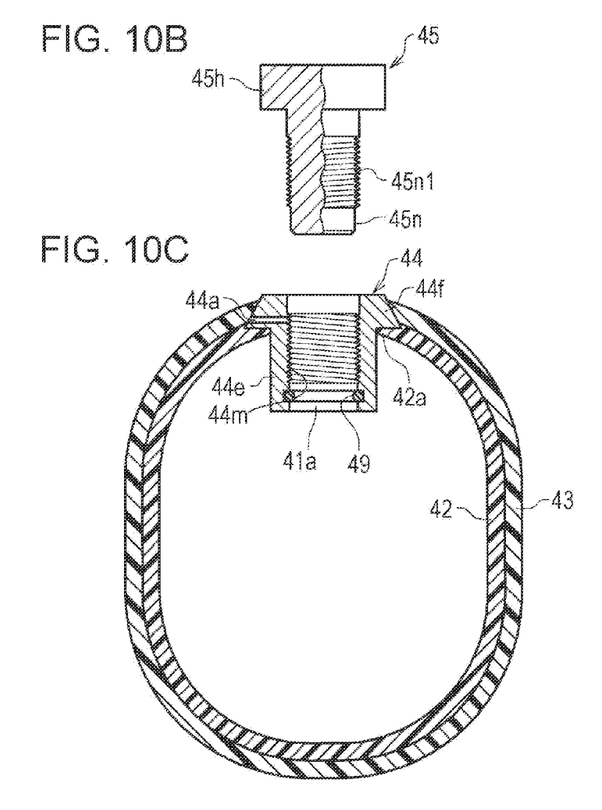
FIG. 10B illustrates a tank plug of the high-pressure gas tank of the fourth variant.
FIG. 10C is a longitudinal sectional view illustrating a state in which the tank plug of the high-pressure gas tank of the fourth variant is opened.

FIG. 10A is a longitudinal sectional view illustrating the main portion of the internal structure of a high-pressure gas tank 41 of a fourth variant. FIG. 10B illustrates a tank plug 45 of the high-pressure gas tank 41 of the fourth variant. FIG. 10C is a longitudinal sectional view illustrating a state in which the tank plug 45 of the high-pressure gas tank 41 of the fourth variant is opened.

Unlike the embodiment, in the high-pressure gas tank 41 of the fourth variant, a vent hole 44a is formed in a metal boss 44, to which the tank plug 45 is attached. Unlike the third variant, axial sealing is provided over the gap between the tank plug 45 and the metal boss 44. Since other structures are similar to those of the embodiment, elements similar to those of the embodiment are denoted by reference signs in the forty series, thereby omitting the detailed description.

The metal boss 44 has an inlet/outlet port 41a, a cylindrical portion 44e, and a flange portion 44f. The inlet/outlet port 41a as an insertion hole penetrates through the metal boss 44 at a central portion of the metal boss 44. The metal boss 44 is formed of, for example, a stainless steel (such as SUS304) by casting or machining.

A female thread 44m is formed in the inlet/outlet port 41a of the metal boss 44 so as to be engaged with the tank plug 45.

The vent hole 44a is formed in the flange portion 44f of the metal boss 44. The vent hole 44a is a through hole through which the gas, which has leaked into the gap between a liner 42 and a reinforcing layer 43, is released to the outside of the high-pressure gas tank 41. The vent hole 44a is formed so as to allow communication between the gap between the liner 42 and the reinforcing layer 43 and a space between the tank plug 45 and a screw portion 45n.

The tank plug 45 illustrated in FIG. 10B has the screw portion 45n and a plug head portion 45h. A male thread 45n1 is formed in the screw portion 45n.

A sealing member 49 such as an O-ring or a rubber packing is provided in an inner surface at an end portion of the cylindrical portion 44e of the metal boss 44. The sealing member 49 is in contact with the screw portion 45n of the tank plug 45 so as to provide axial sealing over the gap between the screw portion 45n of the tank plug 45 and the inner surface of the cylindrical portion 44e of the metal boss 44 in a gas tight manner. The gas inside the liner 42 can be prevented from leaking to the outside through the gap between the inner surface of the cylindrical portion 44e of the metal boss 44 and the screw portion 45n of the tank plug 45 by the sealing member 49. The sealing member 49 may be provided in the screw portion 45n on the tank plug 45 side instead of in the cylindrical portion 44e of the metal boss 44.

In order to use the high-pressure gas tank 41, the male thread 45n1 of the screw portion 45n of the tank plug 45 (see FIG. 10B) is engaged with the female thread 44m of the metal boss 44, thereby screwing the tank plug 45 into the metal boss 44. Then, a high pressure gas such as a fuel gas is charged into a space formed by the liner 42 of the high-pressure gas tank 41 illustrated in FIG. 10C. After that, by closing a valve (not shown) incorporated in the tank plug 45, the tank plug 45 of the inlet/outlet port 41a is closed. In order to open the tank plug 45 of the inlet/outlet port 41a, the valve (not shown) incorporated in the tank plug 45 is opened.

According to the fourth variant, the gas having permeated through the liner 42 is dispersed (released) through the vent hole 44a of the metal boss 44 before the gas accumulates in the gap between the liner 42 and the reinforcing layer 43 and generates or increases the pressure in the gap between the liner 42 and the reinforcing layer 43. Thus, the differential pressure between the gas inside the liner 42 and the gas present in the gap between the liner 42 and the reinforcing layer 43 is reduced, and accordingly, there is no occurrence of buckling. As a result, a tank residual pressure inside the liner 42, that is, the amount of gas required to remain inside the liner 42 can be reduced. Thus, the amount of gas (amount of hydrogen) that can be used can be increased.

Furthermore, the sealing member 49 provides axial sealing over the gap between the inner surface of the cylindrical portion 44e of the metal boss 44 and the screw portion 45n of the tank plug 45. Thus, the region where the vent hole 44a can be provided in the metal boss 44 is increased to a region that opposes the screw portion 45n and the plug head portion 45h of the tank plug 45. This increases the degree of freedom with which the vent hole 44a is positioned.

Also with the third or fourth variant, in the case where the amount of the gas to be dispersed through the vent hole 34a or 44a of the high-pressure gas tank 31 or 41 is small, the gas having permeated through the liner 32 or 42 is dispersed (released) into the atmosphere outside the high-pressure gas tank 31 or 41.

In the case where the amount of the gas to be dispersed is large, a channel from the vent hole 34a or 44a is connected to the vent line (discharging channel, not shown) of the vehicle, thereby allowing the gas having penetrated through the liner 32 or 42 to flow into the vent line. Thus, the gas can be appropriately released to the outside of the vehicle.

With the structure according to any of the embodiment and the first to fourth variants as described above, buckling is prevented from occurring, and the amount of an effective gas (such as hydrogen) that can be stored in the high-pressure gas tank can be increased.

Other Variants

1. In the embodiment and the first to fourth variants, a gas stored in the high-pressure gas tank is exemplified by a fuel gas (hydrogen). However, the gas may be a gas other than a fuel gas (hydrogen).

2. In the embodiment and the first to fourth variants, a fuel gas tank used in a fuel-cell vehicle (vehicle) is an example in the description. However, it is clear that the present disclosure can be used for a tank other than that used in a fuel-cell vehicle (vehicle).

3. In the embodiment and the first to fourth variants, the fiber of the reinforcing layer is exemplified by a carbon fiber. However, the fiber of the reinforcing layer may be a fiber other than a carbon fiber as long as the fiber can similarly functions and operates.

4. In the examples illustrated in the embodiment and the first to fourth variants, the gas dispersion ports 6a, 16a, and 26a as accumulated gas release channels are respectively formed in the spindle attachments for FW 6, 16, and 26, and the vent holes 34a and 44a are respectively formed in the metal bosses 34 and 44. However, the accumulated gas release channels may be provided in both the spindle attachment for FW and the metal boss.

5. In the embodiment and the first to fourth variants, a variety of structures have been described. These structures may be appropriately or arbitrarily combined with one another.

Although a variety of embodiments and variant of the present disclosure have been described, a variety of modifications and changes are possible within the scope of the present disclosure. That is, appropriate or arbitrary changes are possible as long as the gist of the present disclosure is not changed.

What is claimed is:

1. A pressure gas container comprising:
   a liner to store a gas thereinside;
   a reinforcing layer provided on an outer side of the liner;
   a boss attached to the liner, the boss having an opening through which the gas is introduced into the liner and through which the gas inside the liner is released; and
   an attachment attached to an outer surface of the liner, the attachment being used to support the liner such that the liner is rotatable when the reinforcing layer is provided, at least one of the boss and the attachment having an accumulated gas release channel that allows communication between a gap formed between the outer side of the liner and an inner side of the reinforcing layer and a space outside the pressure gas container so as to release the gas having permeated through the liner and present in the gap between the liner and the reinforcing layer to the space outside the pressure gas container,
   wherein the attachment has the accumulated gas release channel, and
   wherein the attachment has a recessed gas vent passage that is formed at a position opposite the outer surface of the liner, radially extends from the accumulated gas release channel at the center, and communicates with the accumulated gas release channel.

2. The pressure gas container according to claim 1, wherein a gas permeation member that allows the gas in the gap between the liner and the reinforcing layer to permeate therethrough is disposed in the accumulated gas release channel.

3. The pressure gas container according to claim 1, wherein a plug that suppresses releasing of the gas is disposed in the accumulated gas release channel.

4. A vehicle comprising:
   the pressure gas container according to claim 1,
   wherein the accumulated gas release channel is connected to a discharging channel for an exhaust gas.

* * * * *